(12) United States Patent
Gillberg et al.

(10) Patent No.: US 6,852,297 B2
(45) Date of Patent: Feb. 8, 2005

(54) METHOD OF TREATING RESIDUAL ACID

(75) Inventors: Lars Gillberg, Lund (SE); Roger Bårström, Ödåkra (SE); Hannu Luhtala, Esbo (FI)

(73) Assignee: Kemira Kemi AB, Helsingborg (SE)

( * ) Notice: Subject to any disclaimer, the term of this patent is extended or adjusted under 35 U.S.C. 154(b) by 0 days.

(21) Appl. No.: 10/406,226

(22) Filed: Apr. 4, 2003

(65) Prior Publication Data

US 2004/0126310 A1 Jul. 1, 2004

(30) Foreign Application Priority Data

Apr. 4, 2002 (SE) ................................. 0201016

(51) Int. Cl.$^7$ ................................. D21C 11/00
(52) U.S. Cl. .................. 423/140; 423/558; 423/146; 423/DIG. 1; 423/DIG. 2
(58) Field of Search ................ 423/633, 634, 423/DIG. 1, DIG. 2, 478, 558, 140, 146, 493

(56) References Cited

U.S. PATENT DOCUMENTS

| | | | | |
|---|---|---|---|---|
| 4,036,941 A | * | 7/1977 | Boyles et al. | 423/558 |
| 4,104,365 A | * | 8/1978 | Howard et al. | 423/531 |
| 4,299,652 A | * | 11/1981 | Masuno et al. | 162/30.11 |
| 4,329,199 A | * | 5/1982 | Andersson et al. | 162/19 |
| 4,578,261 A | * | 3/1986 | Lobley | 423/478 |
| 4,695,386 A | * | 9/1987 | Berry | 210/665 |
| 5,294,307 A | * | 3/1994 | Jackson | 205/349 |
| 5,505,774 A | * | 4/1996 | Manning | 106/697 |

FOREIGN PATENT DOCUMENTS

| | | |
|---|---|---|
| GB | 463458 | 3/1937 |
| SE | 466850 B | 4/1992 |
| WO | WO 79/00899 A1 | 11/1979 |

OTHER PUBLICATIONS

Database WPI, Week 200055, Derwent Publication Ltd., London, GB; AN 2000–579818 & CN1259592 A(Chen X, Gu J, Shang G) Jul. 12, 2000, Abstract.

* cited by examiner

*Primary Examiner*—Ngoc-Yen Nguyen
(74) *Attorney, Agent, or Firm*—Birch, Stewart, Kolasch & Birch, LLP

(57) ABSTRACT

A method of treating residual acid from production of chlorine dioxide is described. The method is characterized in that a compound containing iron is added to the residual acid to react therewith and form a product, which contains iron in trivalent form. As iron compound preferably ferrous sulphate is added, which under oxidation reacts with the residual acid to form ferric salt. Preferably sodium chlorate, sodium hypochlorite, hydrogen peroxide or an oxygen-containing gas is added as oxidant.

7 Claims, No Drawings

METHOD OF TREATING RESIDUAL ACID

FIELD OF THE INVENTION

The present invention relates to a method of treating residual acid from production of chlorine dioxide.

TECHNICAL BACKGROUND

In the manufacturing of papermaking pulp, the pulp is, inter alia, subject to bleaching using bleaching chemicals. A widely used bleaching chemical is chlorine dioxide ($ClO_2$). Chlorine dioxide is often produced on site at the pulp mill that uses the chlorine dioxide in its pulp bleaching. There are various ways of producing chlorine dioxide. One such generally applied process is the Mathieson process, which was developed in the 1950s by Olin-Mathieson Chemical Corporation. In this process, chlorine dioxide is formed by reduction of sodium chlorate ($NaClO_3$) with sulphur dioxide ($SO_2$) in the presence of sulphuric acid ($H_2SO_4$). Another common process for producing chlorine dioxide is a process resembling the Mathieson process, but using hydrogen peroxide ($H_2O_2$) instead of sulphur dioxide. In this process, hydrogen peroxide and sodium chlorate are caused to react in the presence of sulphuric acid to form chlorine dioxide.

In both processes described above not only chlorine dioxide forms, but also a residual product, which mainly consists of sulphuric acid and sodium hydrogen sulphate ($NaHSO_4$). This residual product is generally called "residual acid". Sometimes the residual acid can to some extent be used by the pulp mill as an agent for adjusting the pH or as an agent for cleaving tall oil. But the residual acid is mainly a waste product. Before disposal, this acid waste product has to be neutralized. Considering that a typical pulp mill produces about 10,000 tonnes of residual acid a year, it is obvious that great efforts and costs are required to render the residual acid nonhazardous and to dispose of it.

Therefore it would signify a great step forward in this technical field if the residual acid could be used as a starting material for the production of useful and valuable products, instead of being disposed of at high costs.

SUMMARY OF THE INVENTION

The present invention aims to obviate or reduce the disadvantages involved in prior-art technique and to provide a way of making residual acid from production of chlorine dioxide useful.

According to the invention, a method is thus provided of treating residual acid from production of chlorine dioxide, which method is characterized in that a compound containing iron is added to the residual acid to react therewith and form a product, which contains iron in trivalent form.

The product obtained, which contains a ferric salt or basic ferric salts, can be used as coagulant for purifying wastewater or surface water, either in the form the product is obtained or after concentration. The wastewater which is purified can be either wastewater from the pulp mill or some other wastewater, such as municipal wastewater. The product can also be used as coagulant for purifying drinking water.

The economy of the method according to the invention is improved as the starting materials used are cheap.

Further features and advantages of the invention will appear from the description below and the appended claims.

DETAILED DESCRIPTION OF THE INVENTION

As stated above, a coagulant is obtained in the method according to the invention by the residual acid being caused to react with a compound containing iron to form a product, which contains iron in trivalent form.

As iron-containing compound, use can be made of a compound containing iron in divalent and/or trivalent form. Examples thereof are ferrous sulphate ($FeSO_4$), ferrous chloride ($FeCl_2$), magnetite ($Fe_3O_4$ or $FeO.Fe_2O_3$) ferric hydroxide sulphates, ferric oxide hydroxide ($FeOOH$), ferric hydroxide ($Fe(OH)_3$) and hematite ($Fe_2O_3$). A presently preferred iron compound is ferrous sulphate. If a compound containing divalent iron, such as ferrous sulphate, is used, the ferrous ions are oxidized and, depending on the amount of residual acid added, ferric sulphate or basic ferric sulphates are obtained. Although the residual acid may contain a certain residual amount of sodium chlorate, this amount is generally insufficient and an oxidant is added to achieve a more complete oxidation of the ferrous sulphate. This oxidant can be selected among various known oxidants, and at present sodium chlorate, sodium hypochlorite, hydrogen peroxide or an oxygen-containing gas is preferably added as oxidant. The oxygen-containing gas can, for example, be air, oxygen gas or ozone, and is preferably pure oxygen.

If desired, extra acid, in addition to the residual acid, can be added in the method according to the invention. This extra acid can preferably be selected from hydrochloric acid, sulphuric acid and nitric acid.

When using sodium chlorate, hydrogen peroxide and ozone as oxidant, the reaction is usually quick and exothermic and no particular heating of the reaction mixture is needed. When using oxygen as oxidant, the reaction is slower and a certain extent of heating of the reaction mixture, in combination with an addition of one or more catalysts, should be used to make the reaction proceed at the desired rate. As a general rule, the higher the temperature, the shorter the reaction time.

Preferably, the reaction with the residual acid is carried out during a period of time of from about 1 min to about 10 h. It is also preferred for the temperature to be from ambient temperature to about 200° C., more preferably about 80–150° C.

When use is made of sodium chlorate to oxidize ferrous sulphate, the reaction formula is:

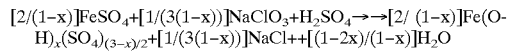

$[2/(1-x)]FeSO_4+[1/(3(1-x))]NaClO_3+H_2SO_4 \rightarrow \rightarrow [2/(1-x)]Fe(OH)_x(SO_4)_{(3-x)/2}+[1/(3(1-x))]NaCl++[(1-2x)/(1-x)]H_2O$ As is apparent from the formula, a certain amount of sodium chloride is also obtained, in addition to the ferric (hydroxide)sulphate desired. Usually, this sodium chloride does not cause any problems for the use of the obtained product as coagulant for purifying wastewater and drinking water.

To make it easier to understand the invention, it will be described below by way of non-limiting examples. All indications of percentage refer to percent by weight, if not otherwise stated.

EXAMPLE 1

The starting material was residual acid from a paper mill, obtained in the production of chlorine dioxide according to the Mathieson process and containing 15.9% sulphur, 0.13% chlorine, 6.6% sodium and hydrogen ions in an amount corresponding to 33.3% sulphuric acid. To 35 g of this residual acid the following was added: 201.8 g water, 132.1 g ferrous sulphate heptahydrate and 8.5 g sodium chlorate. All the reactants had room temperature. When adding the sodium chlorate, heat was generated. An analysis of the mixture showed that its density was 1284 kg/m³. The mixture contained in total 7.0% iron and 0.0% Fe(II), i.e. all the iron was present in trivalent form. The molar ratio OH/Fe was 0.5.

EXAMPLE 2

To 52.5 g of residual acid of the same type as in Example 1 the following was added: 184.3 g water, 132.1 g ferrous sulphate heptahydrate and 8.5 g sodium chlorate. All the reactants had room temperature. When adding the sodium chlorate, reaction heat was generated. An analysis of the mixture showed that its density was 1314 kg/m$^3$. The mixture contained in total 7.0% iron and its content of Fe(II) was 0.0%, i.e. all the iron was present in trivalent form. The molar ratio OH/Fe was 0.26.

EXAMPLE 3

To 70.0 g of residual acid of the same type as in Example 1 the following was added: 166.8 g water, 132.1 g ferrous sulphate heptahydrate and 8.5 g sodium chlorate. All the reactants had room temperature. When adding the sodium chlorate, reaction heat was generated. An analysis of the mixture showed that its density was 1346 kg/m$^3$. The mixture contained in total 7.0% iron and its content of Fe(II) was 0.0%, i.e. all the iron was present in trivalent form. The molar ratio OH/Fe was 0.02.

A sample of the product was tested as coagulant for water purification in a municipal wastewater treatment plant. It exhibited the same properties as a conventional ferric sulphate coagulant as to the reduction of residual turbidity and residual concentrations of total phosphorus and orthophosphate.

A comparison between Examples 1–3 shows that it is possible to produce ferric sulphate with different basicities by adding different amounts of residual acid in relation to the amount of ferrous sulphate.

EXAMPLE 4

The starting material was residual acid from a paper mill, obtained in the production of chlorine dioxide according to the Mathieson process and containing 12.1% sulphur, 0.18% chlorine, 6% sodium and hydrogen ions in an amount corresponding to 23.3% sulphuric acid. To 50 g of this residual acid the following was added: 187 g water, 132.1 g ferrous sulphate heptahydrate and 8.5 g sodium chlorate. All the reactants had room temperature. When adding the sodium chlorate, heat was generated. An analysis of the mixture showed that its density was 1280 kg/m$^3$. The mixture contained 0.1% Fe(II) and in total 7.2% iron. The molar ratio OH/Fe was 0.51.

EXAMPLE 5

To 100 g of residual acid of the same type as in Example 4 the following was added: 137 g water, 132.1 g ferrous sulphate heptahydrate and 8.5 g sodium chlorate. When adding the sodium chlorate, reaction heat was generated. An analysis of the mixture showed that its density was 1330 kg/m$^3$. The mixture contained 0.16% Fe(II) and in total 7.2% iron. The molar ratio OH/Fe was 0.04.

A comparison between Example 4 and 5 shows that it is possible to produce ferric sulphate with different basicities by adding different amounts of residual acid in relation to the amount of ferrous sulphate.

What we claim and desire to secure by Letters Patent is:

1. A method of treating residual acid from production of chlorine dioxide, comprising adding a compound containing iron to the residual acid to react therewith and form a product, which contains iron in trivalent form.

2. A method as claimed in claim 1, wherein the iron compound is a compound containing divalent iron.

3. A method as claimed in claim 1, wherein the iron compound is ferrous sulphate, ferrous chloride or magnetite, which under oxidation reacts with the residual acid to form ferric sulphate or a basic ferric sulphate.

4. A method as claimed in claim 2 or 3, wherein an oxidant is added for oxidation of the compound containing divalent iron.

5. A method as claimed in claim 4, wherein sodium chlorate, sodium hypochlorite, hydrogen peroxide or an oxygen-containing gas is added as oxidant.

6. A method as claimed in claim 1, wherein the iron compound is a ferric hydroxide sulphate, ferric hydroxide, ferric oxide hydroxide or hematite ($Fe_2O_3$).

7. A method as claimed claim 1, wherein the reaction mixture is kept at a temperature of from ambient temperature to 200° C.

* * * * *